US010070477B1

(12) United States Patent
Marupaduga et al.

(10) Patent No.: US 10,070,477 B1
(45) Date of Patent: Sep. 4, 2018

(54) MODIFICATION OF NON-GUARANTEED BIT RATE (NON-GBR) BEARERS THROUGH WIRELESS REPEATER CHAINS INTO GUARANTEED BIT RATE (GBR) BEARERS THROUGH THE WIRELESS REPEATER CHAINS

(71) Applicant: Sprint Communications Company L.P., Overland Park, KS (US)

(72) Inventors: Sreekar Marupaduga, Overland Park, KS (US); Saravana Velusamy, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 140 days.

(21) Appl. No.: 15/278,758

(22) Filed: Sep. 28, 2016

(51) Int. Cl.
*H04W 72/10* (2009.01)
*H04W 72/08* (2009.01)
*H04W 76/27* (2018.01)
*H04W 76/04* (2009.01)
*H04B 7/14* (2006.01)
*H04W 28/02* (2009.01)
*H04W 24/02* (2009.01)
*H04W 88/16* (2009.01)

(52) U.S. Cl.
CPC ............. *H04W 76/27* (2018.02); *H04B 7/14* (2013.01); *H04W 28/0268* (2013.01); *H04W 76/046* (2013.01); *H04W 88/16* (2013.01)

(58) Field of Classification Search
CPC ............. H04W 24/08; H04W 28/0268; H04L 5/0057; H04L 43/16
See application file for complete search history.

(56) References Cited

U.S. PATENT DOCUMENTS

| 5,978,364 | A | 11/1999 | Melnik |
| 8,656,239 | B2 | 2/2014 | Ho |
| 8,885,542 | B2 | 11/2014 | Bucknell et al. |
| 9,100,988 | B2 | 8/2015 | Vilmur et al. |
| 2014/0112242 | A1* | 4/2014 | Vilmur .................. H04W 16/26 370/327 |

(Continued)

FOREIGN PATENT DOCUMENTS

| WO | 2015120917 | 8/2015 |
| WO | 2015133945 | 9/2015 |
| WO | 2016059063 | 4/2016 |

*Primary Examiner* — Charles C Jiang
*Assistant Examiner* — Will Lin

(57) ABSTRACT

A wireless communication network modifies a non-Guaranteed Bit Rate (non-GBR) bearer through a wireless repeater chain into a Guaranteed Bit Rate (GBR) bearer. A wireless access node exchanges user data with User Equipment (UE) over the non-GBR bearer through the wireless repeater chain. The wireless node monitors latency of the user data exchange over the non-GBR bearer through the wireless repeater chain. When the latency of the non-GBR bearer through the wireless repeater chain exceeds a latency threshold, the wireless node transfers a bearer modification request for the UE to a core packet network. The wireless node receives a bearer modification instruction for the UE from the core packet network to modify the non-GBR bearer into a GBR bearer. In response, the wireless node modifies the non-GBR bearer into the GBR bearer and exchanges user data with the UE over the GBR bearer through the wireless repeater chain.

20 Claims, 6 Drawing Sheets

(56) References Cited

U.S. PATENT DOCUMENTS

| | | | |
|---|---|---|---|
| 2014/0233439 A1 | 8/2014 | Hong et al. | |
| 2015/0257024 A1* | 9/2015 | Baid | H04W 24/10 370/338 |
| 2016/0353462 A1* | 12/2016 | Jiang | H04W 24/02 |
| 2017/0374644 A1* | 12/2017 | Ryu | H04W 68/02 |

* cited by examiner

MODIFICATION OF NON-GUARANTEED BIT RATE (NON-GBR) BEARERS THROUGH WIRELESS REPEATER CHAINS INTO GUARANTEED BIT RATE (GBR) BEARERS THROUGH THE WIRELESS REPEATER CHAINS

TECHNICAL BACKGROUND

Data communication systems exchange user data for user devices to provide various data communication services. The user devices may be phones, computers, media players, intelligent machines, and the like. The data communication services might be media streaming, video conferencing, machine-to-machine data transfers, internet access, or some other data communication service.

Data communication systems use wireless access nodes to extend the range of their communication services and enable user service mobility. The wireless access nodes perform wireless networking tasks like device handovers, radio interference management, and multipoint coordination. In Long Term Evolution (LTE) networks, the wireless access nodes are evolved Node Bs (eNodeBs).

To extend this wireless data service footprint even more, wireless data repeaters are used in between the wireless access nodes and the user devices. A wireless repeater receives a wireless signal from a user device and then amplifies, filters, and retransmits the signal for receipt by the wireless access node or another wireless repeater. Likewise, a wireless repeater receives a wireless signal from the wireless access node. The wireless repeater amplifies, filters, and retransmits the signal for receipt by the user device or another wireless repeater. Chains or sequences of wireless repeaters are often used to cover roadways and trails with wireless data communication service.

Data communication networks offer various Quality-of-Service (QoS) levels. A prime QoS level is Guaranteed Bit Rate (GBR) where the data network monitors and enforces latency limitations by allocating more resources as needed to maintain the GBR. Non-GBR is a best effort QoS without the strict latency protections of GBR. Non-GBR is generally cheaper than GBR and is often just fine for many data applications. In LTE systems, QoS Class Indicators are used to specify various QoS levels. QCIs 1-4 are GBR QCIs, and QCI 5-9 comprise non-GBR QCIs.

The vastly extended range provided by the wireless repeaters is somewhat offset by the additional latency or delay that in caused by each repeater in a wireless link. In a long chain of repeaters, a user device may experience excessive latency on their non-GBR connections. For example, a non-GBR QCI 9 bearer through a long wireless repeater chain may become too slow for the user.

TECHNICAL OVERVIEW

A wireless communication network modifies a non-Guaranteed Bit Rate (non-GBR) bearer through a wireless repeater chain into a Guaranteed Bit Rate (GBR) bearer. A wireless access node exchanges user data with User Equipment (UE) over the non-GBR bearer through the wireless repeater chain. The wireless access node monitors latency of the user data exchange over the non-GBR bearer through the wireless repeater chain. When the latency of the non-GBR bearer through the wireless repeater chain exceeds a latency threshold, the wireless access node transfers a bearer modification request for the UE to a core packet network. The wireless access node receives a bearer modification instruction for the UE from the core packet network to modify the non-GBR bearer into a GBR bearer. In response, the wireless access node modifies the non-GBR bearer into the GBR bearer and exchanges user data with the UE over the GBR bearer through the wireless repeater chain.

DETAILED DESCRIPTION

Figure 1:
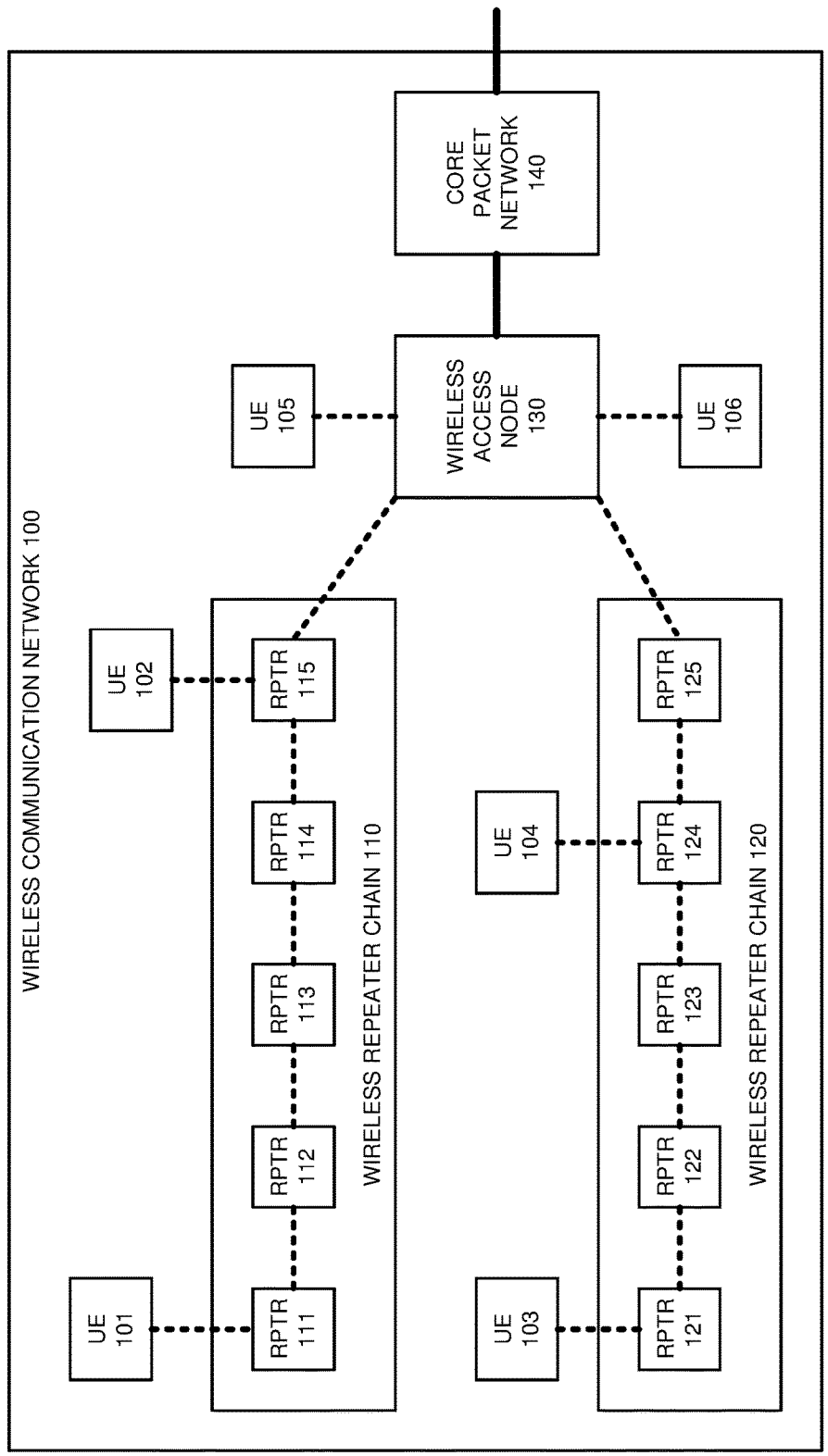
FIGS. 1-4 illustrate a wireless communication network to modify a non-Guaranteed Bit Rate (non-GBR) bearer through a wireless repeater chain into a Guaranteed Bit Rate (GBR) bearer through the wireless repeater chain.

FIGS. 1-4 illustrate wireless communication network 100 to modify a non-Guaranteed Bit Rate (non-GBR) bearer through wireless repeater chain 110 into a Guaranteed Bit Rate (GBR) bearer through wireless repeater chain 110. Referring to FIG. 1, wireless communication network 100 exchanges user data for User Equipment (UE) 101-106. UEs 101-106 comprise computers, phones, or some other intelligent machines with wireless communication transceivers. The data exchanges support data services such as content streaming, media conferencing, machine communications, internet access, or some other computerized information service.

Wireless communication network 100 comprises UEs 101-106, wireless repeater chains 110 and 120, wireless access node 130, and core packet network 140. Wireless repeater chain 110 comprises wireless repeaters (RPTRs) 111-115. Wireless repeater chain 120 comprises wireless repeaters 121-125. Wireless repeaters 111-115 and 121-125 each comprise antennas, modulators, amplifiers, filters, and signal processing circuitry. Wireless repeaters 111-115 and 121-125 receive, amplify, and retransmit wireless communication signals.

Wireless access node 130 has antennas, modulators, amplifiers, filters, and signal processors. Wireless access node 130 also has data processing circuitry, memory, operating software to control the transceivers and serve network applications. The network applications include UE attachment, bearer set-up, and user data transfer. Wireless access node 130 could be an evolved Node B (eNodeB), Wireless Fidelity (WIFI) hotspot, 5G Millimeter Wave (MMW) base station, or some other computer system with wireless data interfaces. Core packet network 140 comprises wireless network gateways, controllers, and databases that direct UE communication sessions and exchange the user data.

In operation, wireless access node 130 exchanges user data between UEs 101-106 and core packet network 140. UE 101 and wireless access node 130 exchange user data over repeaters 111-115 in repeater chain 110. UE 102 and wireless access node 130 exchange user data over repeater 115 in repeater chain 110. UE 103 and wireless access node 130 exchange user data over repeaters 121-125 in repeater chain 120. UE 104 and wireless access node 130 exchange user data over repeaters 124-125 in repeater chain 120. UEs 105-106 and wireless access node 130 exchange user data directly without the use of repeater chains 110 and 120. Initially, all of these user data exchanges use non-GBR bearers.

Wireless access node 130 monitors the latency of the user data exchanges over the non-GBR bearers through the wireless repeater chains 110 and 120. The latency monitoring is typically based on transmit time stamps in the user data packets as related to the receive time. Wireless access node 130 may monitor end-to-end latency from UEs 101-104 through repeater chains 110 and 120, wireless access node 130, and core packet network 140. Alternatively, wireless access node 130 may monitor wireless latency from UEs 101-104 through repeater chains 110 and 120 to wireless access node.

In some examples, a UE may request the bearer modification. For example, UE 101 may detect an unwarranted amount of latency through repeater chain 110 and transfer a bearer modification request to wireless access node 130. In another example, UE 101 may detect the latency and transfer a bearer modification request to core packet network 140 for authorization and transfer to wireless access node 130. In both examples, wireless access node 130 would then verify the latency and initiate bearer modification.

When the latency of the non-GBR bearer through one of wireless repeater chains 110 or 120 exceeds a latency threshold, wireless access node 130 transfers a bearer modification request for the UE to core packet network 140. For example, the latency between UE 101 and wireless access node 130 may exceed a latency threshold of N milliseconds. If the latency of a non-GBR bearer through wireless repeater chain 110 or 120 does not exceed the latency threshold, then wireless access node 130 does not attempt to modify the non-GBR bearers.

UEs 105-106 do not qualify for the non-GBR bearer modification because UEs 105-106 are not attached to wireless access node 130 through repeater chain 110 or 120. UEs 102 and 104 qualify for the non-GBR bearer modification because UEs 102 and 104 are attached to wireless access node 130 through repeater chains 110 and 120. However, UEs 102 and 104 are not eligible for the non-GBR bearer modification because UEs 101 and 104 have low latency.

In this example, the latency for UE 101 exceeds the latency threshold for non-GBR bearers that traverse repeater chain 110, so wireless access node 130 transfers a bearer modification request for UE 101 to core packet network 140. Core packet network 140 authorizes the bearer modification request and modifies its non-GBR bearer for UE 101 to a GBR bearer. Core packet network 140 also returns a bearer modification response to wireless access node 130.

Wireless access node 130 receives the bearer modification instruction for UE 101 from core packet network 140 to modify the non-GBR bearer into a GBR bearer. In response, wireless access node 130 modifies the non-GBR bearer for UE 101 into a GBR bearer. Wireless access node 130 also transfers the bearer modification instruction to UE 101 to modify the non-GBR bearer into a GBR bearer. In response, wireless access node 130 and UE 101 modify the non-GBR bearer into a GBR bearer. UE 101 and wireless access node 130 now exchange user data over the GBR bearer through wireless repeater chain 110.

Figure 2:
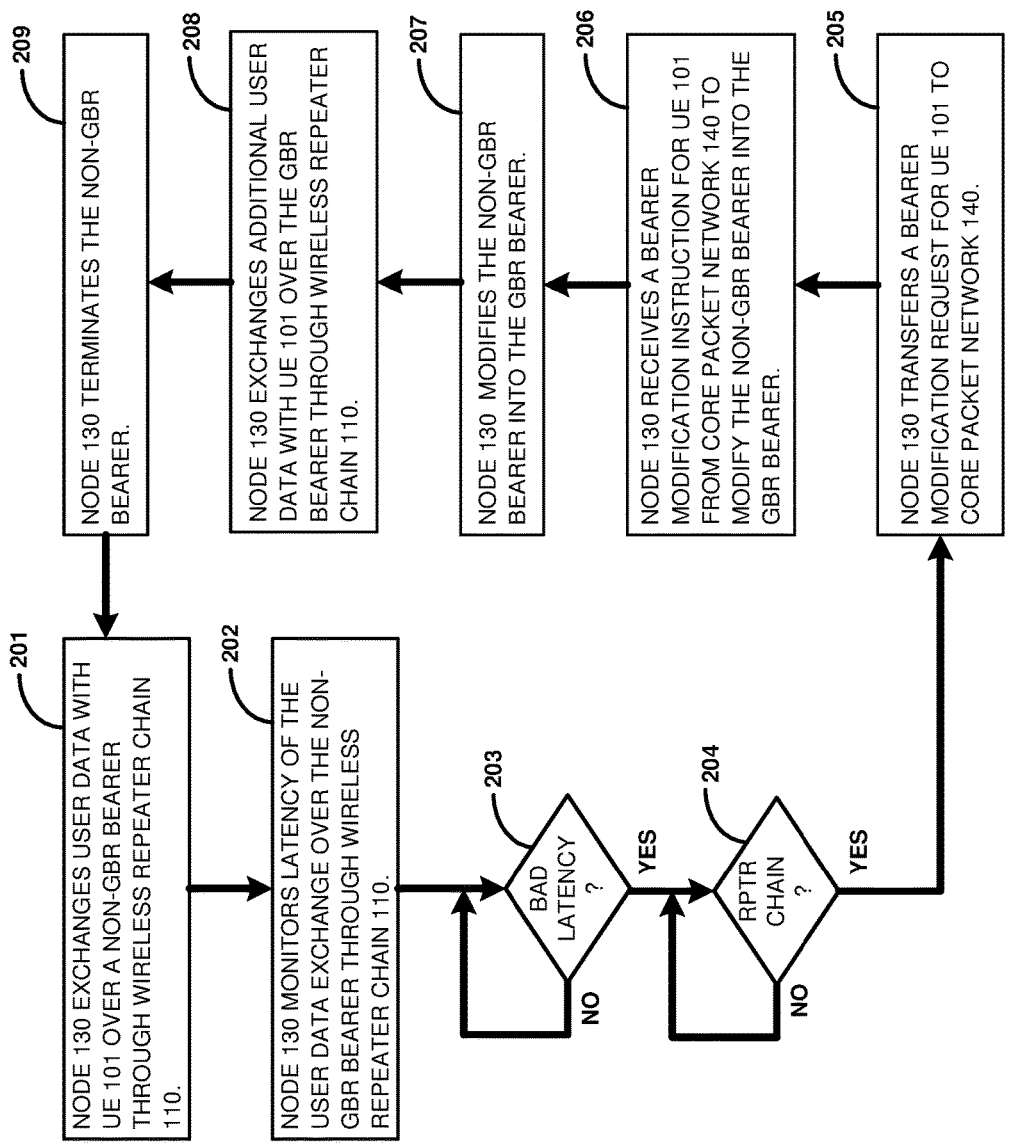

Referring to FIG. 2, wireless access node 130 operations are described. wireless access node 130 exchanges user data with UE 101. Wireless access node 130 and UE 101 exchange the user data over a non-GBR bearer through wireless repeater chain 110 comprising repeaters 111-115 (201). For example, UE 101 may attach to wireless access node 130 through repeater chain 110 and receive a Long Term Evolution (LTE) bearer through core packet network 140. This initial LTE bearer could be a Quality-of-service Class Indicator (QCI) 8, QCI 9, or some other non-GBR data link.

Wireless access node 130 monitors the latency of the user data exchange over the non-GBR bearer through the wireless repeater chain 110 for UE 101 (202). To determine latency, wireless access node 130 may read packet time stamps, perform Round-Trip Delay (RTD) testing, or use some other technique. When the latency of the non-GBR bearer for UE 101 exceeds a latency threshold (203), wireless access node 130 determines if the non-GBR bearer traverses a wireless repeater chain. If the non-GBR bearer for UE 101 also traverses a wireless repeater chain (204), wireless access node 130 transfers a bearer modification request for UE 101 to core packet network 140 (205). For example, wireless access node 130 may transfer an S1-MME message to a Mobility Management Entity (MME) in packet core network 140. In alternative examples, operations 203-204 could be switched in time or performed in parallel.

Wireless access node 130 receives a bearer modification instruction for UE 101 from core packet network 140 to modify the non-GBR bearer into a GBR bearer (206). For example, wireless access node 130 may receive another S1-MME message from the MME in packet core network 140. Wireless access node 130 modifies the non-GBR bearer for UE 101 into a GBR bearer (207). For example, wireless access node 130 may stop scheduling LTE resource blocks to UE 101 at QCI 8 and start scheduling LTE resource blocks to UE 101 at QCI 1. Wireless access node 130 and UE 101 now exchange user data over the GBR bearer through wireless repeater chain 110 (208). Eventually, wireless access node 130 terminates the GBR bearer through wireless repeater chain 110 for UE 101 (209) and the operation may reset.

Figure 3:
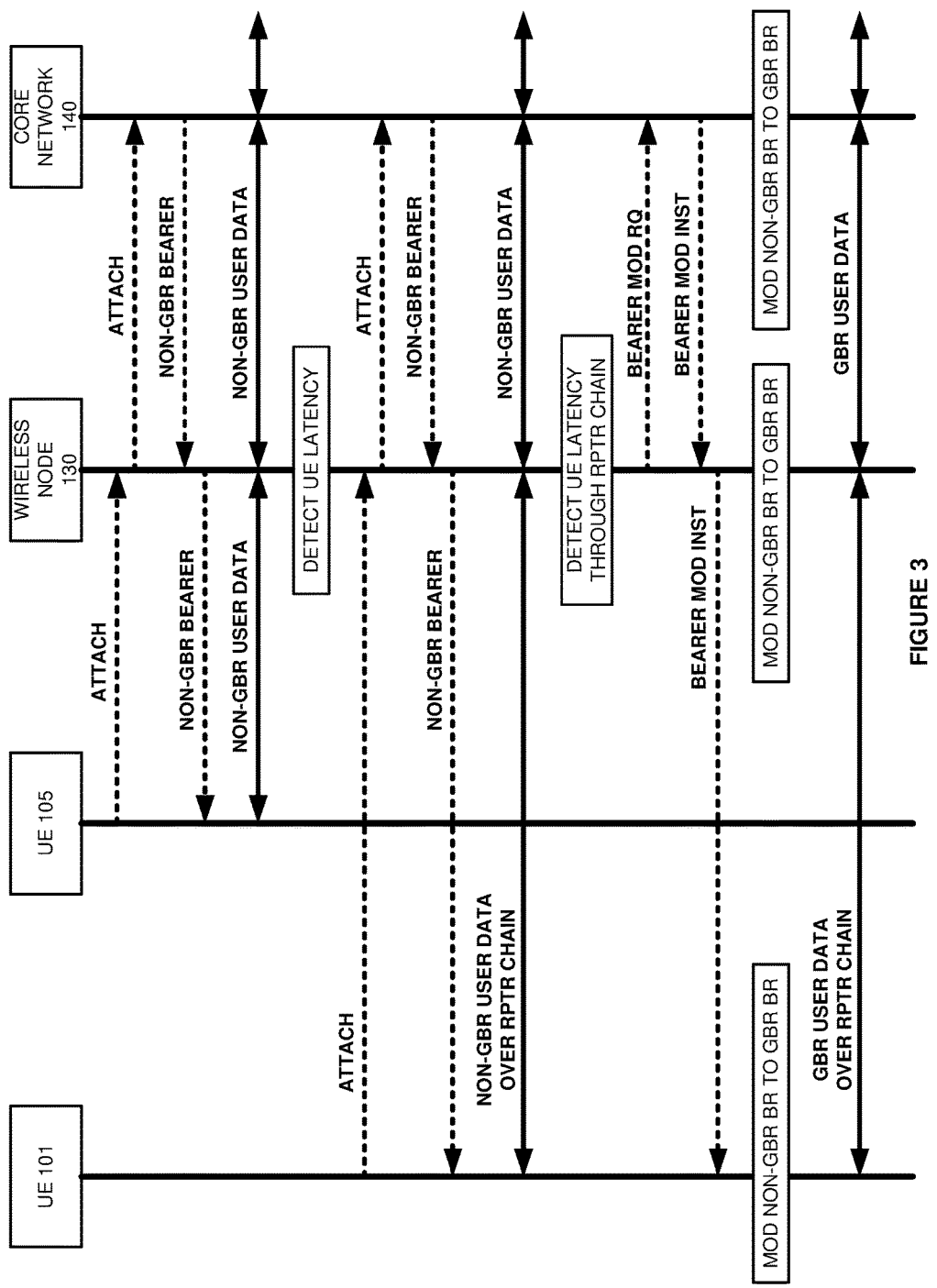

Referring to FIG. 3, wireless communication network 100 operations are described for UEs 101 and 105. UE 105 attaches to wireless access node 130 over a Radio Resource Configuration (RRC), WIFI, LTE/WIFI Aggregation (LWA), 5G MMW, or some other type of wireless link. Wireless access node 130 transfers attachment signaling like an S1-MME Initial UE message for UE 105 to core network 140. Core network 140 returns a non-GBR bearer instruction to wireless access node 130 for UE 105, and wireless access node 130 transfers the non-GBR bearer instruction to UE 105. UE 105 and wireless access node 130 directly exchange user data over a non-GBR bearer. Wireless access node 130 and core network 140 exchange the user data over the non-GBR bearer, and core network 140 exchanges the user data with other systems (not shown). Wireless access node 130 detects latency for the user data exchange over the non-GBR bearer for UE 105. For example, the time stamps in the packets from UE 105 may indicate excessive latency. Since UE 105 is not attached through a wireless repeater chain, wireless access node 130 does not transfer a bearer modification request for UE 105—although other remedial action may be taken.

UE 101 then attaches to wireless access node 130 through wireless repeaters 111-115 in wireless repeater chain 110. Wireless access node 130 transfers attachment signaling to core network 140 for UE 101, and core network 140 returns a non-GBR bearer instruction for UE 101 to wireless access node 130. Wireless access node 130 transfers the non-GBR bearer instruction to UE 101. UE 101 and wireless access node 130 exchange user data over a non-GBR bearer through wireless repeater chain 110. Wireless access node 130 and core network 140 exchange the user data over the non-GBR bearer, and core network 140 exchanges the user data with the other systems.

Wireless access node 130 detects latency for the user data exchange over the non-GBR bearer through wireless repeater chain 110 for UE 101. For example, the time stamps in the packets from UE 101 may indicate excessive latency through a repeater chain. Since UE 101 has bad latency through a wireless repeater chain, wireless access node 130 transfers a bearer modification request for UE 101 to core network 140. Wireless access node 130 receives a bearer modification instruction for UE 101 from core network 140 to modify the non-GBR bearer into a GBR bearer. Wireless access node 130 transfers the bearer modification instruction to UE 101. UE 101, wireless access node 130, and core network 140 then modify the non-GBR bearer for UE 101 into a GBR bearer. For example, wireless access node 130 may begin scheduling resource blocks for UE 101 at QCI 1. Wireless access node 130 and UE 101 now exchange user data over the GBR bearer through wireless repeater chain 110.

Figure 4:
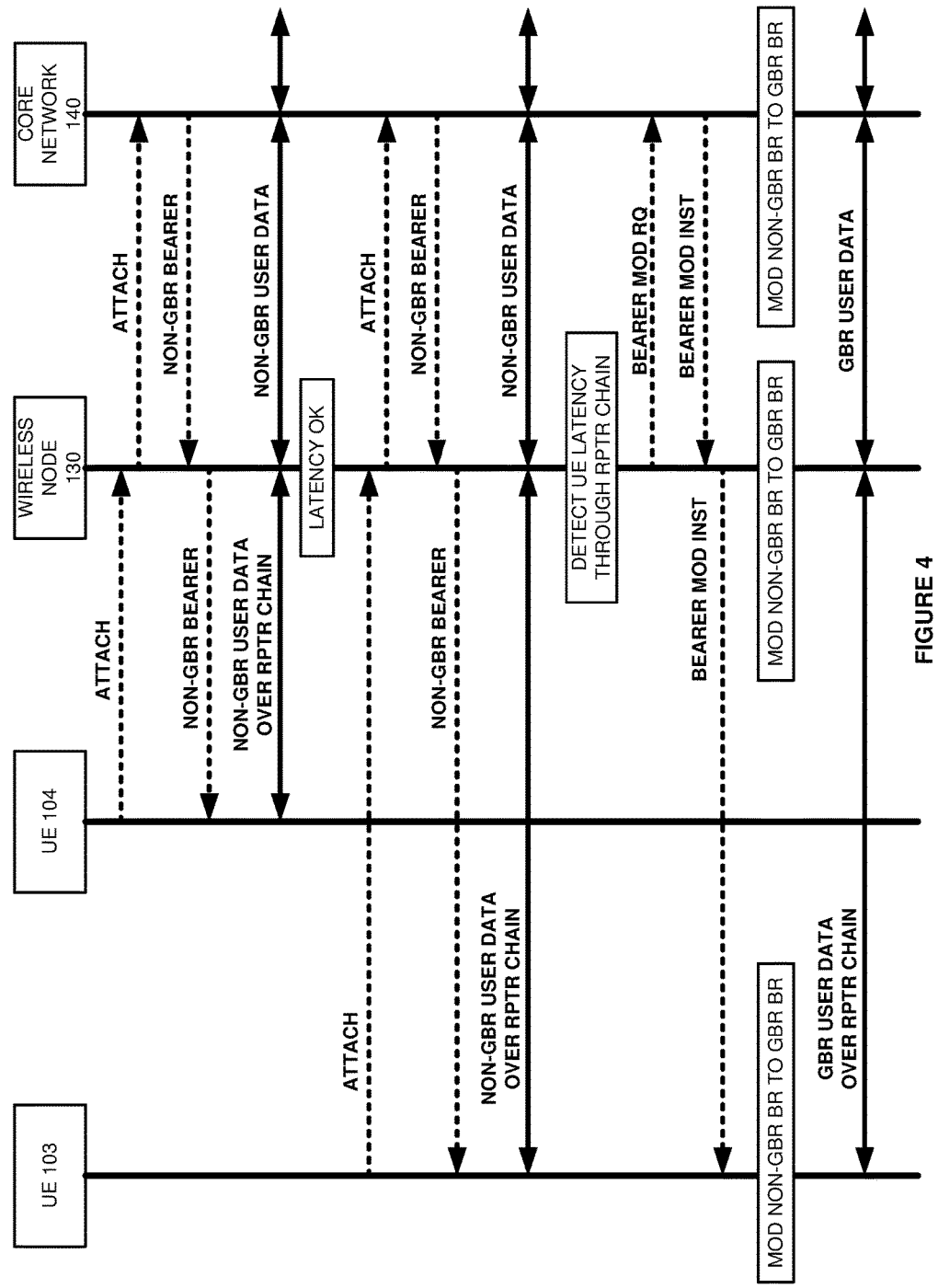

Referring to FIG. 4, wireless communication network 100 operations are described for UE 103 and UE 104. UE 104 attaches to wireless access node 130 through wireless repeaters 124-125 in wireless repeater chain 120. Wireless access node 130 transfers attachment signaling to core network 140 for UE 104, and core network 140 returns a non-GBR bearer instruction for UE 104 to wireless access node 130. Wireless access node 130 transfers the non-GBR bearer instruction to UE 104. UE 104 and wireless access node 130 exchange user data over a non-GBR bearer through wireless repeater chain 120. Wireless access node 130 and core network 140 exchange the user data over the non-GBR bearer, and core network 140 exchanges the user data with the other systems. Wireless access node 130 does not detect excessive latency on the user data exchange over the non-GBR bearer through the wireless repeater chain 120 for UE 104. Since UE 104 has adequate latency through the wireless repeater chain, wireless access node 130 does not transfer any bearer modification request for UE 104 to core network 140.

UE 103 now attaches to wireless access node 130 through wireless repeaters 121-125 in wireless repeater chain 120. Wireless access node 130 transfers attachment signaling to core network 140 for UE 103, and core network 140 returns a non-GBR bearer instruction for UE 103 to wireless access node 130. Wireless access node 130 transfers the non-GBR bearer instruction to UE 103. UE 103 and wireless access node 130 exchange user data over a non-GBR bearer through wireless repeater chain 120. Wireless access node 130 and core network 140 exchange the user data over the non-GBR bearer, and core network 140 exchanges the user data with the other systems.

Wireless access node 130 detects latency for the user data exchange over the non-GBR bearer through wireless repeater chain 120 for UE 103. For example, an RTD test with UE 103 may indicate excessive latency through a wireless repeater chain. Since UE 103 has bad latency through a wireless repeater chain, wireless access node 130 transfers a bearer modification request for UE 103 to core network 140. Wireless access node 130 receives a bearer modification instruction for UE 103 from core network 140 to modify the non-GBR bearer into a GBR bearer. Wireless access node 130 transfers the bearer modification instruction to UE 103. UE 103, wireless access node 130, and core network 140 then modify the non-GBR bearer for UE 103 into a GBR bearer. For example, wireless access node 130 may start to schedule UE 103 at QCI 2. Wireless access node 130 and UE 103 now exchange user data over the GBR bearer through wireless repeater chain 120. Wireless access node 130 and core network 140 exchange the user data over the non-GBR bearer, and core network 140 exchanges the user data with the other systems.

Figure 5:
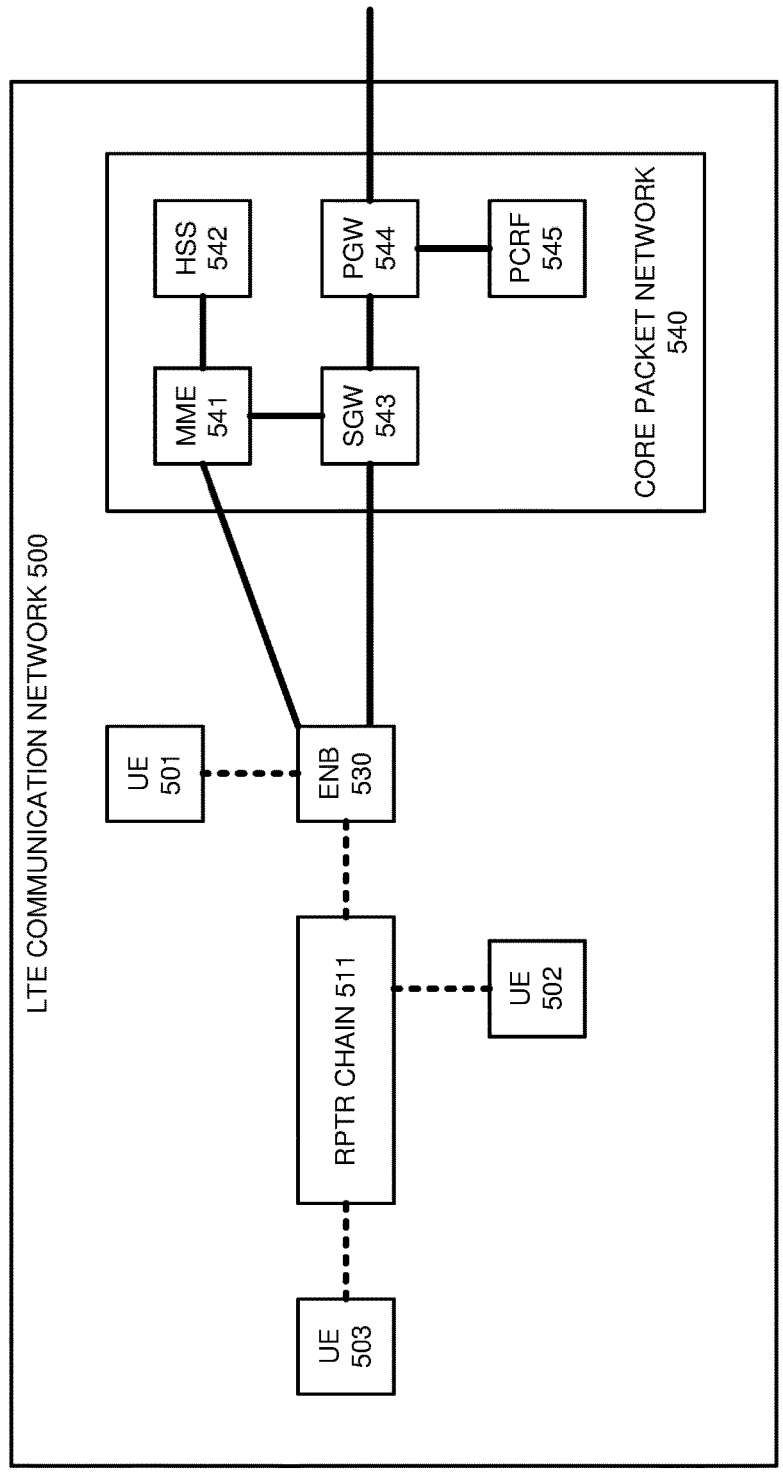
FIG. 5 illustrates a Long Term Evolution (LTE) communication network to modify a non-GBR bearer through a wireless repeater chain into a GBR bearer through the wireless repeater chain.

FIG. 5 illustrates Long Term Evolution (LTE) communication network 500 to modify a non-Guaranteed Bit Rate (non-GBR) bearer through wireless repeater chain 511 into a Guaranteed Bit Rate (GBR) bearer through the wireless repeater chain 511. LTE communication network 500 is an example of wireless communication network 100, although network 100 may use alternate operations and configurations. LTE communication network 500 comprises UEs 501-503, wireless repeater chain 511, eNodeB (ENB) 530, and core packet network 540. Wireless repeater chain 511 comprises a series or tree of wireless data communication repeaters. Core packet network 540 comprises Mobility Management Entity (MME 541), Home Subscriber System (HSS) 542, Serving Gateway (SGW) 543, Packet Data Network Gateway (PGW) 544, and Policy Charging and Rules Function (PCRF) 545.

In operation, UE 501 attaches to ENB 530 over an RRC, WIFI, or LWA link. ENB 530 transfers an S1-MME Initial UE message for UE 501 to MME 541 in core network 540. MME 540 dips HSS 542 to authorize UE 501 and receives an Application Point Name (APN) for UE 501 like APN INET for internet access. MME 540 transfers an S11 create session message with the APN for UE 501 to SGW 543. SGW 543 transfers an S5 create bearer message with the APN for UE 501 to PGW 544. PGW 544 dips PCRF 545 with the APN for UE 501 to identify non-GBR QCI 9 for UE 501. PGW 544 returns an S5 create bearer message with QCI 9 for UE 501 to SGW 543. SGW 543 transfers an S11 create bearer message with QCI 9 for UE 501 to MME 541.

MME 541 transfers an S1-MME session context message with QCI 9 for UE 501 to ENB 530. ENB 530 transfers the non-GBR bearer instruction to UE 501. UE 501 and ENB 530 directly exchange user data over the non-GBR QCI 9 wireless bearer. ENB 530 and SGW 543 exchange the user data over non-GBR QCI 9 S1-U bearer. SGW 543 and PGW 544 exchange the user data over non-GBR QCI 9 S5 bearer. PGW 544 exchanges the user data over an SGi link. eNodeB 530 detects latency for the user data exchange over the non-GBR QCI 9 bearer for UE 501. Since UE 501 is not attached through a wireless repeater chain, eNodeB 530 does not transfer an S1-MME bearer modification request for UE 501—although other remedial action may be taken.

UE 502 then attaches to ENB 530 through wireless repeater chain 511 over an RRC, WIFI, or LWA link. ENB 530 transfers an S1-MME Initial UE message for UE 502 to MME 541 in core network 540. MME 540 dips HSS 542 to authorize UE 502 and receives an APN for UE 502 like INET. MME 540 transfers an S11 create session message with the APN for UE 502 to SGW 543. SGW 543 transfers an S5 create bearer message with the APN for UE 502 to PGW 544. PGW 544 dips PCRF 545 with the APN for UE 502 to identify non-GBR QCI 9 for UE 501. PGW 544 returns an S5 create bearer message with QCI 9 for UE 502 to SGW 543. SGW 543 transfers an S11 create bearer message with QCI 9 for UE 502 to MME 541.

MME 541 transfers an S1-MME session context message with QCI 9 for UE 502 to ENB 530. ENB 530 transfers the non-GBR bearer instruction to UE 502. UE 502 and ENB 530 exchange user data over the non-GBR QCI 9 wireless bearer through wireless repeater chain 511. ENB 530 and SGW 543 exchange the user data over non-GBR QCI 9 S1-U bearer. SGW 543 and PGW 544 exchange the user data over non-GBR QCI 9 S5 bearer. PGW 544 exchanges the user data over an SGi link. eNodeB 530 does not detect excessive latency for the user data exchange over the non-GBR QCI 9 bearer for UE 502. Although UE 502 is attached through wireless repeater chain 511, eNodeB 530 does not transfer an S1-MME modify bearer request for UE 502.

UE 503 then attaches to ENB 530 through wireless repeater chain 511 over an RRC, WIFI, or LWA link. ENB 530 transfers an S1-MME Initial UE message for UE 503 to MME 541 in core network 540. MME 540 dips HSS 542 to authorize UE 503 and receives an APN for UE 503 like INET. MME 540 transfers an S11 create session message with the APN for UE 503 to SGW 543. SGW 543 transfers an S5 create bearer message with the APN for UE 503 to PGW 544. PGW 544 dips PCRF 545 with the APN for UE 503 to identify non-GBR QCI 9 for UE 503. PGW 544 returns an S5 create bearer message with QCI 9 for UE 503 to SGW 543. SGW 543 transfers an S11 create bearer message with QCI 9 for UE 503 to MME 541.

MME 541 transfers an S1-MME session context message with QCI 9 for UE 503 to ENB 530. ENB 530 transfers the non-GBR bearer instruction to UE 503. UE 503 and ENB 530 exchange user data over the non-GBR QCI 9 wireless bearer through wireless repeater chain 511. ENB 530 and SGW 543 exchange the user data over non-GBR QCI 9 S1-U bearer. SGW 543 and PGW 544 exchange the user data over non-GBR QCI 9 S5 bearer. PGW 544 exchanges the user data over an SGi link.

eNodeB 530 detects excessive latency for the user data exchange over the non-GBR QCI 9 bearer for UE 503. Since UE 503 is attached through wireless repeater chain 511, ENB 530 transfers an S1-MME modify bearer request for UE 503 to MME 541. MME 541 may dip HSS 542 to determine if UE 503 is authorized for a GBR upgrade. MME transfers an S11 modify bearer message for UE 503 to SGW 543. SGW 543 forwards an S5 modify bearer message for UE 503 to PGW 544. PGW 544 dips PCRF 545 with the modify bearer request for UE 503 to identify a GBR QCI 1 to replace the non-GBR QCI 9 bearer for UE 503. PGW 544 returns an S5 modify bearer message with the GBR QCI 1 for UE 503 to SGW 543. SGW 543 transfers an S11 modify bearer message with the GBR QCI 1 for UE 503 to MME 541.

MME 541 transfers an S1-MME session configuration message with the GBR QCI 1 for UE 503 to ENB 530. ENB 530 transfers the GBR QCI 1 configuration instruction to UE 503. Instead of the slower non-GBR QCI 9 bearer, UE 503 and ENB 530 now exchange user data over the faster GBR QCI 1 wireless bearer through wireless repeater chain 511. ENB 530 and SGW 543 exchange the user data over a faster GBR QCI 1 S1-U bearer. SGW 543 and PGW 544 exchange the user data over a faster GBR QCI 1 S5 bearer. PGW 544 exchanges the user data over the SGi link.

In some examples, UE 503 detects performance issues like latency through a wireless repeater chain and triggers the latency monitoring by ENB 530. For example, UE 503 may detect excessive data latency through wireless repeater chain 511 with time stamps or RTD testing and transfer an RRC service request to ENB 530 to check the latency on its non-GBR bearers. Alternatively, UE 503 may detect excessive data latency through wireless repeater chain 511 and transfer a Non-Access Stratum (NAS) service request to MME 541 through wireless repeater chain 511 and ENB 530, and the NAS message would indicate the latency on the non-GBR bearers for UE 503. MME may responsively send an S1-MME message to ENB 530 indicating the latency on the non-GBR bearers for UE 503. ENB 530 may then initiate its latency monitoring for UE 503 in response to either form of UE-initiated messaging.

Figure 6:
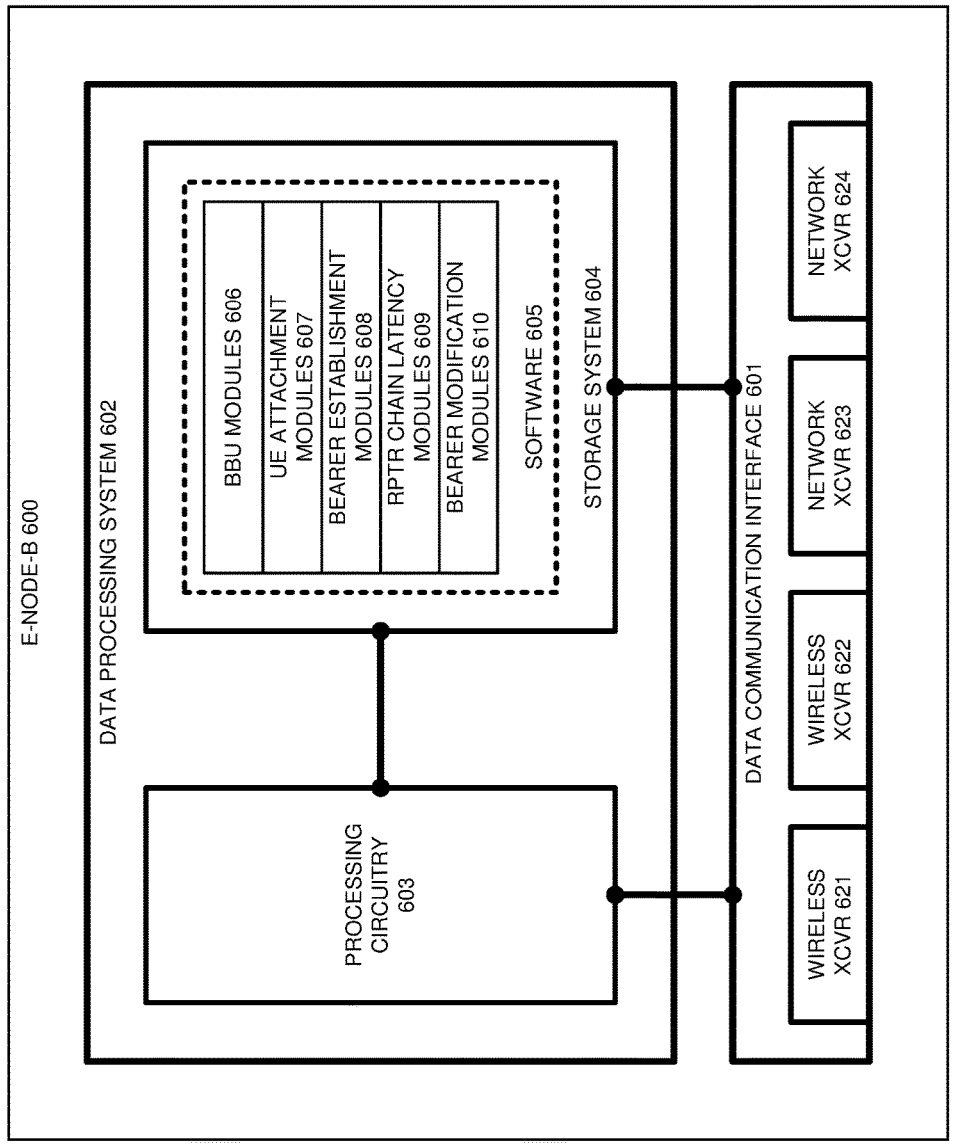
FIG. 6 illustrates an eNodeB to modify a non-GBR bearer through a wireless repeater chain into a GBR bearer through the wireless repeater chain.

FIG. 6 illustrates eNodeB 600 to modify a non-Guaranteed Bit Rate (non-GBR) bearer through a wireless repeater chain into a Guaranteed Bit Rate (GBR) bearer through the wireless repeater chain. eNodeB 600 is an example of wireless access node 130 and eNodeB 530, although these systems may use alternative configurations and operations. eNodeB 600 comprises data communication interface 601 and data processing system 602. Data communication interface 601 comprises wireless transceivers 621-622 and network transceivers 623-624. Data processing system 602 comprises processing circuitry 603 and storage system 604. Storage system 604 stores software 605. Software 605 includes respective software modules 606-610.

Wireless transceivers 621-622 comprise wireless communication components, such as antennas, amplifiers, filters, modulators, digital signal processors, bus interfaces, memory, software, and the like. Network transceivers 623-624 may comprise wireless and/or wireline communication components, such as ports, bus interfaces, digital signal processors, antennas, amplifiers, filters, modulators, memory, software, and the like. Processing circuitry 603 comprises server blades, circuit boards, bus interfaces, integrated circuitry, and associated electronics. Storage system 604 comprises non-transitory, machine-readable, data storage media, such as flash drives, disc drives, memory circuitry, data servers, and the like. Software 605 comprises machine-readable instructions that control the operation of processing circuitry 603 when executed. eNodeB 600 may be centralized or distributed. All or portions of software 606-610 may be externally stored on one or more storage media, such as circuitry, discs, and the like. Some conventional aspects of eNodeB 600 are omitted for clarity, such as power supplies, enclosures, and the like.

When executed by processing circuitry 603, software modules 606-610 direct circuitry 503 to perform the following operations. Broadband Unit (BBU) modules 606 drive wireless transceivers 621-622 to exchange wireless user data with UEs and wireless repeaters. BBU modules 606 also drive network transceivers 623-624 to exchange user data with core networks. UE attachment modules 607 interface with UEs to establish RRC connections. Bearer establishment modules 608 interface with MMEs to establish bearers. Repeater chain latency modules 609 detect UEs that have slow non-GBR bearers through wireless repeaters. Bearer modification modules 610 interface with MMEs to replace the slow non-GBR bearers with faster GBR bearers through the wireless repeaters.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication network to modify a non-Guaranteed Bit Rate (non-GBR) bearer through a wireless repeater chain into a Guaranteed Bit Rate (GBR) bearer through the wireless repeater chain, the method comprising:

a wireless access node that comprises a Long Term Evolution (LTE) eNodeB exchanging user data with User Equipment (UE);
the wireless access node determining when the UE exchanges the user data over the non-GBR bearer;
the wireless access node determining when the UE exchanges the user data through the wireless repeater chain;
the wireless access node determining when the UE exchanges the user data with a latency that exceeds a latency threshold;
the wireless access node transferring a bearer modification request for the UE to a core packet network when the UE exchanges the user data over the non-GBR bearer-and through the wireless repeater chain and with the latency that exceeds the latency threshold; and
the wireless access node receiving a bearer modification instruction for the UE from the core packet network to modify the non-GBR bearer into the GBR bearer and responsively modifying the non-GBR bearer into the GBR bearer and exchanging additional user data with the UE over the GBR bearer through the wireless repeater chain.

2. The method of claim 1 further comprising:
a Mobility Management Entity (MME) in the core packet network receiving the bearer modification request for the UE;
the MME transferring the bearer modification request to a Serving Gateway (S-GW) for the UE;
the S-GW transferring the bearer modification request to a Packet Data Network Gateway (P-GW) for the UE; and
the P-GW transferring the bearer modification request to a Policy Charging and Rules Function (PCRF) for the UE.

3. The method of claim 2 further comprising the PCRF translating the bearer modification request into the bearer modification instruction to modify the non-GBR bearer to the GBR bearer.

4. The method of claim 3 further comprising:
the PCRF transferring the bearer modification instruction to the P-GW;
the P-GW transferring the bearer modification instruction to the S-GW;
the S-GW transferring the bearer modification instruction to the MME; and
the MME transferring the bearer modification instruction to the wireless access node.

5. The method of claim 4 further comprising, responsive to the bearer modification instruction, the S-GW and the P-GW modifying the non-GBR bearer into the GBR bearer and exchanging the additional user data for the UE over the GBR bearer.

6. The method of claim 5 further comprising the wireless access node transferring the bearer modification instruction to the UE, wherein the UE modifies the non-GBR bearer into the GBR bearer and exchanges the additional user data with the wireless access node over the GBR bearer through the wireless repeater chain.

7. The method of claim 1 wherein the wireless access node determining when the UE exchanges the user data with the latency that exceeds the latency threshold comprises the wireless access node receiving a Radio Resource Configuration (RRC) message from the UE and determining the latency responsive to the RRC message from the UE.

8. The method of claim 1 further comprising:
a Mobility Management Entity (MME) for the UE receiving a Non-Access Stratum (NAS) message from the UE and transferring an S1-MME message for the UE to the wireless access node; and wherein
the wireless access node determining when the UE exchanges the user data with the latency that exceeds the latency threshold comprises the wireless access node determining the latency responsive to the S1-MME message for the UE.

9. The method of claim 1 wherein the GBR bearer comprises a Quality-of-service Class Identifier 1 (QCI 1) bearer.

10. The method of claim 1 wherein the non-GBR bearer comprises a Quality-of-service Class Identifier (QCI) 8 bearer or a QCI 9 bearer.

11. A wireless communication network to modify a non-Guaranteed Bit Rate (non-GBR) bearer through a wireless repeater chain into a Guaranteed Bit Rate (GBR) bearer through the wireless repeater chain, the wireless communication network comprising:
the wireless repeater chain configured to wirelessly repeat user data between User Equipment (UE) and a wireless access node;
the wireless access node comprising a Long Term Evolution (LTE) eNodeB that is configured to exchange the user data with the UE, determine when the UE exchanges the user data over the non-GBR bearer, determine when the UE exchanges the user data through the wireless repeater chain, determine when the UE exchanges the user data with a latency that exceeds a latency threshold, and transfer a bearer modification request for the UE to a core packet network when the UE exchanges the user data over the non-GBR bearer and through the wireless repeater chain and with the latency that exceeds the latency threshold, and
receive a bearer modification instruction for the UE from the core packet network to modify the non-GBR bearer into the GBR bearer, and in response, to modify the non-GBR bearer into the GBR bearer and exchange additional user data with the UE over the GBR bearer through the wireless repeater chain.

12. The wireless communication network of claim 11 further comprising:
a Mobility Management Entity (MME) in the core packet network configured to receive the bearer modification request for the UE and transfer the bearer modification request to a Serving Gateway (S-GW) for the UE;
the S-GW configured to transfer the bearer modification request to a Packet Data Network Gateway (P-GW) for the UE; and
the P-GW configured to transfer the bearer modification request to a Policy Charging and Rules Function (PCRF) for the UE.

13. The wireless communication network of claim 12 further comprising the PCRF configured to translate the bearer modification request into the bearer modification instruction to modify the non-GBR bearer to the GBR bearer.

14. The wireless communication network of claim 13 further comprising:
the PCRF configured to transfer the bearer modification instruction to the P-GW;
the P-GW configured to transfer the bearer modification instruction to the S-GW;
the S-GW configured to transfer the bearer modification instruction to the MME; and the MME configured to transfer the bearer modification instruction to the wireless access node.

15. The wireless communication network of claim 14 further comprising:
the S-GW configured to modify the non-GBR bearer into the GBR bearer and exchange the additional user data for the UE over the GBR bearer responsive to the bearer modification instruction; and
the P-GW configured to modify the non-GBR bearer into the GBR bearer and exchange the additional user data for the UE over the GBR bearer responsive to the bearer modification instruction.

16. The wireless communication network of claim 15 further comprising the wireless access node configured to transfer the bearer modification instruction to the UE, wherein the UE modifies the non-GBR bearer into the GBR bearer and exchanges the additional user data with the wireless access node over the GBR bearer through the wireless repeater chain.

17. The wireless communication network of claim 11 wherein the wireless access node is configured to receive a Radio Resource Configuration (RRC) message from the UE and determine when the UE exchanges the user data with the latency that exceeds the latency threshold responsive to the RRC message from the UE.

18. The wireless communication network of claim 11 further comprising:
a Mobility Management Entity (MME) configured to receive a Non-Access Stratum (NAS) message from the UE and transfer an S1-MME message for the UE to the wireless access node; and wherein
the wireless access node is configured to determine when the UE exchanges the user data with the latency that exceeds the latency threshold responsive to the S1-MME message for the UE.

19. The wireless communication network of claim 11 wherein the GBR bearer comprises a Quality-of-service Class Identifier 1 (QCI 1) bearer.

20. The wireless communication network of claim 11 wherein the non-GBR bearer comprises a Quality-of-service Class Identifier (QCI) 8 bearer or a QCI 9 bearer.

* * * * *